United States Patent [19]

Schwartz et al.

[11] Patent Number: 5,282,493
[45] Date of Patent: Feb. 1, 1994

[54] HIGH PRESSURE FLUID VALVE

[75] Inventors: Harry A. Schwartz, Falmouth, Me.; Wesley B. Skop, Newport Beach, Calif.

[73] Assignee: Contemporary Products, Inc., Portland, Me.

[21] Appl. No.: 1,673

[22] Filed: Jan. 7, 1993

[51] Int. Cl.⁵ .............................................. F16K 31/36
[52] U.S. Cl. ................................... 137/613; 137/505; 137/557; 251/148
[58] Field of Search ............... 137/613, 505.11, 318, 137/614.11, 614.12, 505.25, 393, 505, 557; 251/142, 148

[56] References Cited

U.S. PATENT DOCUMENTS

| | | | |
|---|---|---|---|
| 3,147,761 | 9/1964 | Lecocq | 251/148 X |
| 3,604,445 | 9/1971 | Jordan et al. | 137/613 X |
| 4,015,630 | 4/1977 | Contreras | 137/505.25 |
| 4,020,863 | 5/1977 | Fabish | 137/505.25 X |
| 4,655,246 | 4/1987 | Phlipot et al. | 137/613 X |
| 4,944,292 | 7/1990 | Gaeke | 137/343 X |
| 5,022,435 | 6/1991 | Jaw-Shiann | 137/613 |

Primary Examiner—Martin P. Schwadron
Assistant Examiner—Kevin L. Lee
Attorney, Agent, or Firm—Oblon, Spivak, McClelland, Maier & Neustadt

[57] ABSTRACT

A high pressure fluid valve including a valve body (16), a valving member (18), a first handle (20), a yoke (15), and a second handle (128). The yoke (15) is sized and shaped to fit over the valve body (16) and has a throughhole (116) sized, shaped, and positioned to be brought into register with an end of a passageway (26) in the valve body (16). The second handle (128) is manually manipulatable from the exterior of the valve body (16), is operably connected to the yoke (15) such that movement of the second handle (128) in one direction causes the throughhole (116) in the yoke (15) to be brought into register with the end of the passageway (26) in the valve body (16), and is sufficiently spaced from the first handle (20) to permit easy manual manipulation of both the first handle (20) and the second handle (128).

16 Claims, 3 Drawing Sheets 5,282,493

HIGH PRESSURE FLUID VALVE

FIELD OF THE INVENTION

This invention relates to high pressure fluid valves. In particular, it relates to high pressure gas valves of the type that are used as control mechanisms for opening and closing high pressure gas containers utilizing a yoke style connection. Still more particularly, it relates to high pressure valves of the type that are used as control mechanisms in portable oxygen systems.

BACKGROUND OF THE INVENTION

Standard high pressure gas valves for opening and closing high pressure gas cylinders have handles that are "in line" with the opening from the high pressure gas container. This arrangement has several disadvantages. In particular, the size of the handle is limited by the yoke dimensions, thereby making it difficult for older or arthritic persons to turn the handle. In addition, because of the small size of the handle, a wrench must sometimes be used to operate the valve.

SUMMARY OF THE INVENTION

With the foregoing in mind, the present invention is a high pressure fluid valve comprising a valve body, a valving member, a first handle, a yoke, and a second handle. The valve body contains a first bore that extends in a first direction and that has a first end that communicates with the exterior of the valve body and a second end; a second bore that extends in a second direction that is at least approximately perpendicular to the first direction and that has a first end and a second end that communicates with the exterior of the valve body, the second bore communicating with the first bore at a first juncture located interiorly of the valve body; and a passageway that has a first end and a second end that communicates with the exterior of the valve body, the passageway communicating with the second bore at a second juncture located interiorly of the valve body and spaced from the first juncture. The valving member is received in the second bore and is movable into and out of a position in which it blocks the second bore between the first juncture and the second juncture. The first handle is manually manipulatable from the exterior of the valve body and is operably connected to the valving member such that movement of the first handle causes corresponding movement of the valving member. The yoke is sized and shaped to fit over the valve body and has a throughhole sized, shaped, and positioned to be brought into register with the second end of the passageway in the valve body. The second handle is manually manipulatable from the exterior of the valve body, is operably connected to the yoke such that movement of the second handle in one direction causes the through-hole in the yoke to be brought into register with the second end of the passageway in the valve body, and is sufficiently spaced from the first handle to permit easy manual manipulation of both the first handle and the second handle.

DETAILED DESCRIPTION OF THE PRESENTLY PREFERRED EMBODIMENT

Figure 1:
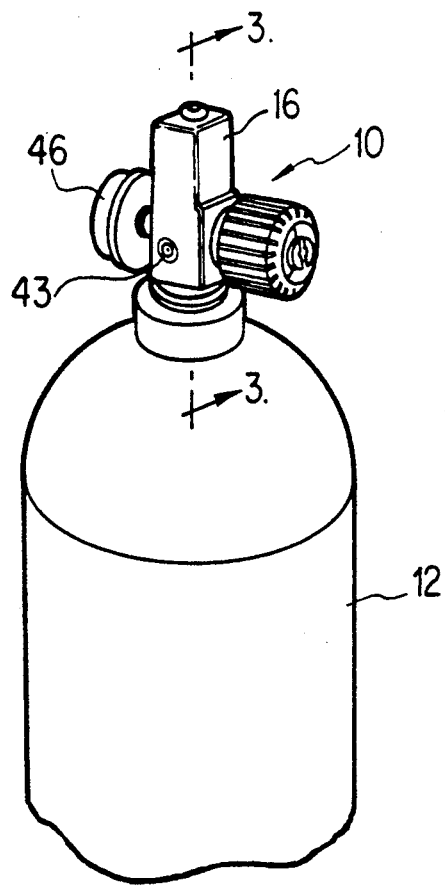
FIG. 1 is a perspective view of the presently preferred embodiment of the invention mounted on a high pressure gas container.

FIG. 1 shows a high pressure fluid valve 10 according to the present invention comprising a valve body 16 mounted on a high pressure gas tank 12. For the sake of clarity, the yoke is omitted from this view. The high pressure gas tank 12 can be, but need not be, an oxygen tank.

Figure 2:
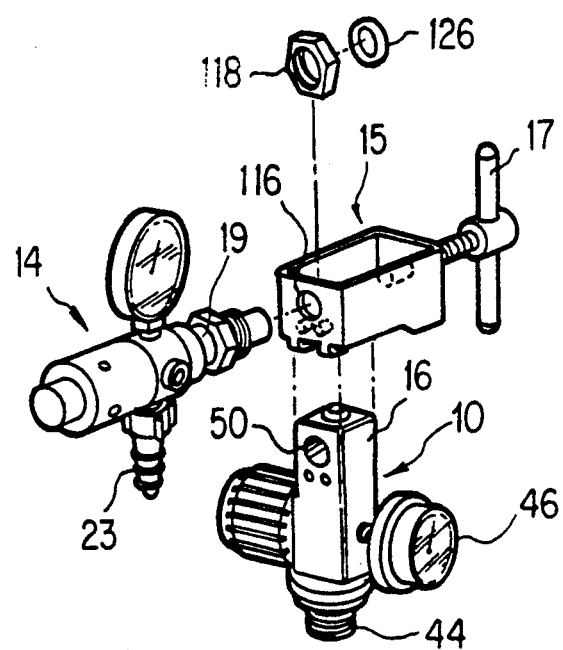
FIG. 2 is an exploded perspective view of the presently preferred embodiment of the invention from the side opposite that depicted in FIG. 1 and showing the presently preferred embodiment in conjunction with a regulator.

The high pressure fluid valve 10 comprises a valve body 16, a valving member 18, and a first handle 20. FIG. 2 shows the valve body 16 in conjunction with a regulator 14 and a yoke 15.

Figure 3:
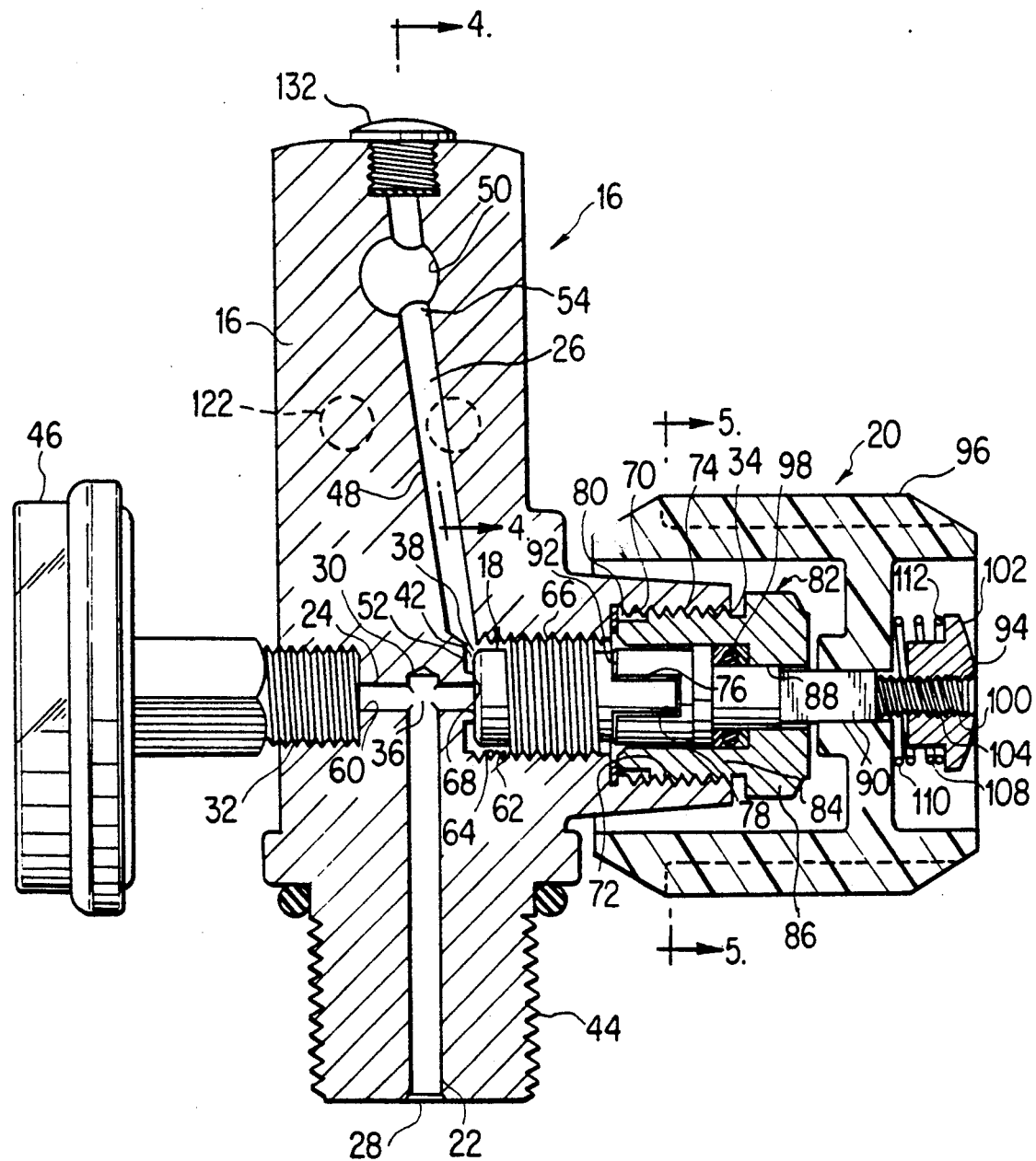
FIG. 3 is an enlarged cross-sectional view on lines 3—3 in FIG. 1.

As best seen in FIG. 3, the valve body 16 has a first bore 22, a second bore 24, and a passageway 26. The first bore 22 extends in a first direction and has a first end 28 that communicates with the exterior of the valve body 16 and a second end 30. The second bore 24 extends in a second direction that is at least approximately perpendicular to the first direction and has a first end 32 and a second end 34 that communicates with the exterior of the valve body 16. The second bore 24 communicates with the first bore 22 at a first juncture 36 located interiorly of the valve body 16. The passageway 26 has a first end 38 and a second end 40 that communicates with the exterior of the valve body 16. The passageway 26 communicates with the second bore 24 at a second juncture 42 located interiorly of the valve body 16 and spaced from the first juncture 36.

A valve safety (i.e., an overpressure vent) 43 is shown in FIG. 1. Basically, it is a bore at a right angle of the first bore 22 and the second bore 24 plugged with a plug that is expelled when the pressure in the high pressure gas tank 12 exceeds a preset maximum. However, since this is a conventional feature, it will not be described further herein.

The valving member 18 is received in the second bore 24 and is movable into and out of a position in which it blocks the second bore 24 between the first juncture 36 and the second juncture 42.

The first handle 20 is manually manipulatable from the exterior of the valve body 16 and is operably connected to the valving member 18 such that movement of the first handle 20 causes corresponding movement of the valving member 18.

In the preferred embodiment, the first end of each of the first and second bores 22 and 24 and the passageway 26 is the upstream end and, correspondingly, the second end of each of the first and second bores 12 and 24 and the passageway 26 is the downstream end. However, it will be appreciated that the high pressure fluid valve 10 could function with the gas passing through it in the opposite direction. Similarly, it will be appreciated that the high pressure valve could be used to valve a liquid or a mixture of a gas and a liquid as well as a gas per se.

As best seen in FIG. 3, the valve body 16 has first external threads 44 surrounding the first end 28 of the first bore 22. The first external threads 44 can be used to thread the high pressure fluid valve 10 into corresponding first internal threads (not shown) in the high pressure gas tank 12.

A pressure gauge (which can be either analog or digital) 46 is shown as being operatively connected to the first bore 22. However, it should be understood that the pressure gauge 46 is optional. Also, the pressure gauge 46 can be directly connected to the first bore 22 or, as shown, it can be directly connected to the second bore 24 (which is in free communication with the first bore 22) at a position upstream of the valving member 18.

The passageway 26 comprises a third bore 48 and a fourth bore 50. The third bore 48 is preferably, and as shown, at an angle to the first bore 22 and has a first end 52 and a second end 54. The first end 52 of the third bore 48 communicates with the second bore 24 at the second juncture 42. The fourth bore 50 is at least approximately perpendicular to the second bore 24 and the third bore 48 and has a first end 56 that communicates with the third bore 48 and a second end 58 that communicates with the exterior of the valve body 16.

The second bore 24 is a stepped bore comprising a first portion 60 having a first diameter and a second portion 62 having a second, larger diameter. The second portion 62 of the second bore 24 contains second internal threads 64, and the valving member 18 has second external threads 66 sized, shaped, and positioned to cooperate with the second internal threads 64 in the second portion 62 of the second bore 24.

A first valve seat 68 is formed around the opening of the first portion 60 of the second bore 24 into the second portion 62 of the second bore 24, and the valving member 18 is moved into and out of engagement with the first valve seat 68 by manipulation of the first handle 20. Preferably, the surface of the valving member 18 that contacts the first valve seat 68 is made of a resilient material to prevent fluid leakage between the first valve seat 68 and the valving member 18. Alternatively, the first valve seat 68 could be lined with an O-ring or the like for the same purpose.

The second bore 24 also comprises a third portion 70 that has a third diameter that is larger than the second diameter -- that is, the diameter of the second portion 62. The third portion 70 of the second bore 24 contains third internal threads 72, and the first handle 20 has third external threads 74 sized, shaped, and positioned to cooperate with the third internal threads 72 in the third portion 70 of the second bore 24.

The first handle 20 is operatively connected to the valving member 18 by a means (described hereinafter) that permit lost motion between the valving member 18 and the first handle 20 in the axial direction of the second bore 24. Those means preferably comprise a non-radially symmetrical male protuberance 76 on either the valving member 18 or the first handle 20 (in the illustrated embodiment, on the valving member 18) and a corresponding female receptacle 78 on the other one of the valving member 18 or the first handle 20 (in the illustrated embodiment, on the first handle 20).

A second valve seat 80 is formed around the opening of the second portion 62 of the second bore 24 into the third portion 70 of the second bore 24, and the first handle 20 is seated against the second valve seat 80 to prevent fluid leakage between the second portion 62 of the second bore 24 and the third portion 70 of the second bore 24. The second valve seat 80 is preferably made of a resilient material. Alternatively, the corresponding face of the first handle 20 could be made of a resilient material.

The first handle comprises a cup shaped member 82 comprising a cylindrical lip 84 and a bottom 86. The third external threads 74 are formed on the exterior of the cylindrical lip 84, and an axial throughhole 88 is formed in the bottom 86. A rod member 90 is mounted in the axial throughhole 88 in the bottom 86 of the cup shaped member 82. The rod member 90 has a first end 92 that is operatively connected to the valving member 18 and a second end 94. A knob 96 is mounted on the second end 94 of the rod member 90.

Packing 98 is provided between the cylindrical lip 84 of the cup shaped member 82 and the rod member 90 to prevent fluid leakage between the cup shaped member 82 and the rod member 90.

The second end 94 of the rod member 90 has fourth external threads 100, and the first handle 20 further comprises a head member 102 having an axial bore 104 containing fourth internal threads 106 sized, shaped, and positioned to cooperate with the fourth internal threads 100. A compression spring 108 has a first end 110 bearing against the knob 96 and a second end 112 bearing against the head member 102.

Figure 7:
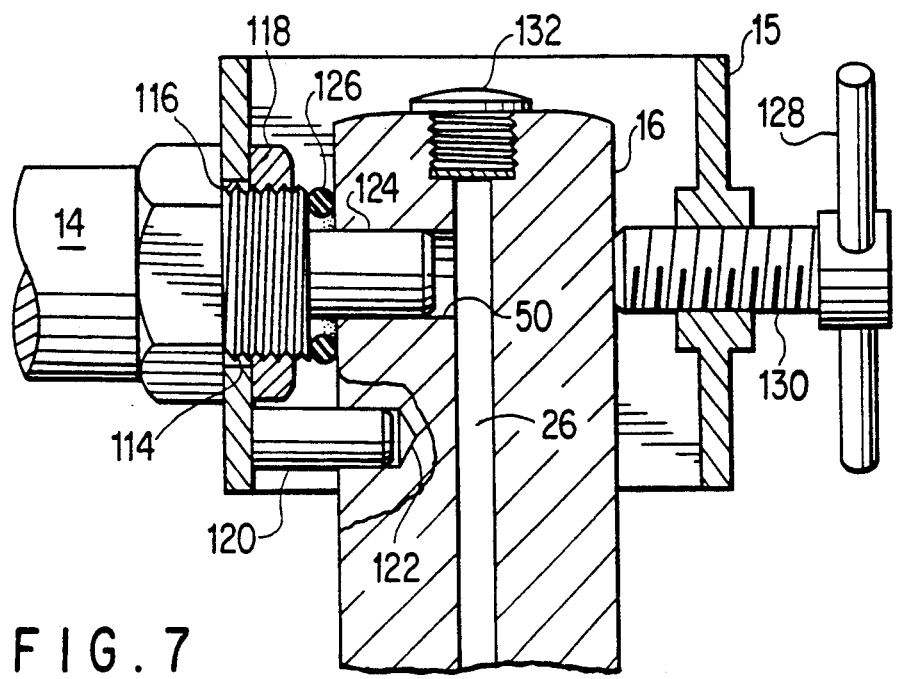
FIG. 7 is a cross-sectional view on lines 7—7 in FIG. 6.
Figure 6:
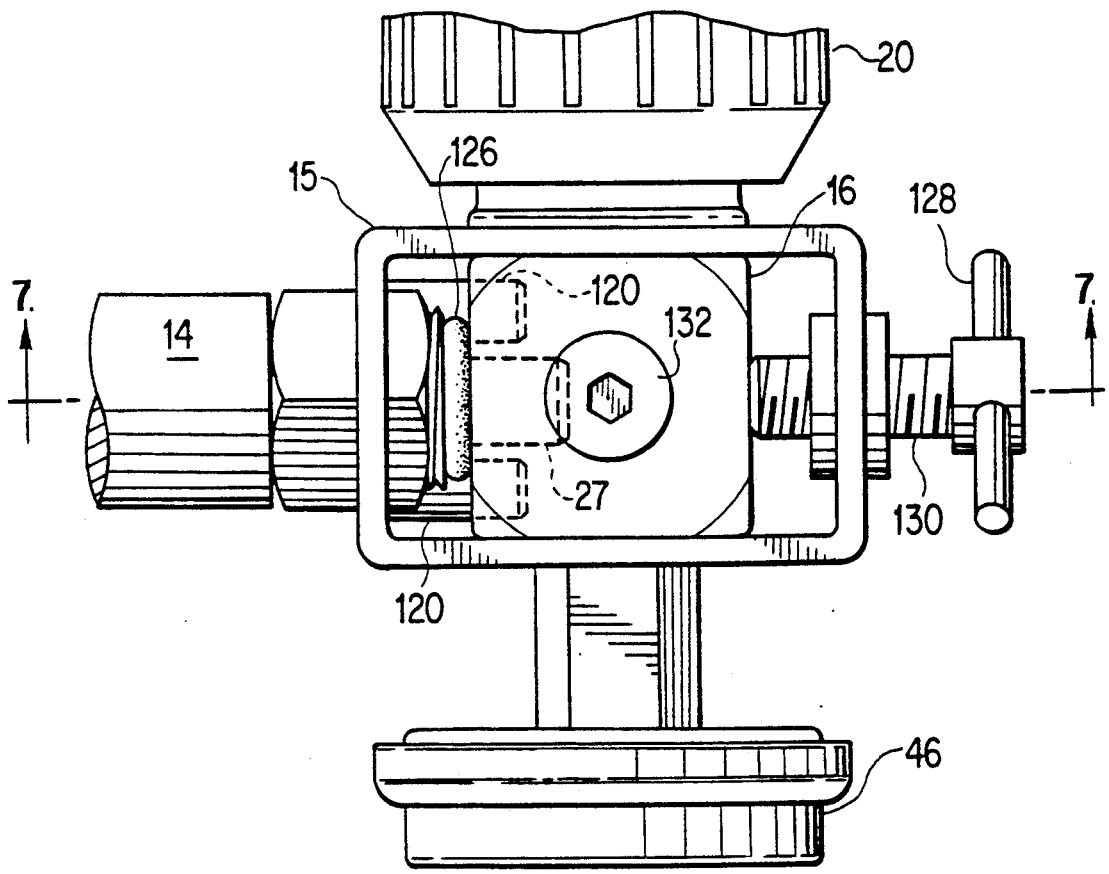
FIG. 6 is a plan view of the presently preferred embodiment of the invention.

In use, the yoke 15 is slipped over the valve body 16. As best seen in FIGS. 6 and 7, a threaded connection 114 which is a part of the regulator 14 is passed through a throughhole 116 in the yoke 15, a nut 118 is threaded onto the threaded connection 114, thereby making the regulator 14 fast to the yoke 15, a pair of indexing pins 120 on the yoke 15 are fitted into corresponding indexing holes 122 in the valve body 11, and an unthreaded extension 124 of the threaded connection 114 is slipped through a washer 126 and into the fourth bore 50 in the valve body 11. A second manually manipulatable handle 128 is then turned, driving a threaded rod 130 against the valve body 11, drawing the unthreaded extension 124 into the fourth bore 50 and compressing the washer 126 to create a seal.

The high pressure fluid valve 10 mediates the flow of gas between the high pressure gas tank 12 and the regulator 14. The gas exits the regulator 14 through a connector 23 (shown in FIG. 2). Since the regulator 14 and the yoke 15 are conventional, they will not be described further herein.

Figure 4:
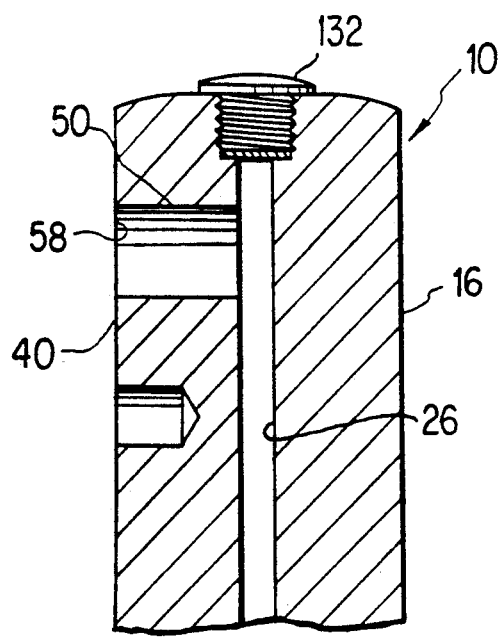
FIG. 4 is a cross-sectional view on lines 4—4 in FIG. 3.
Figure 5:
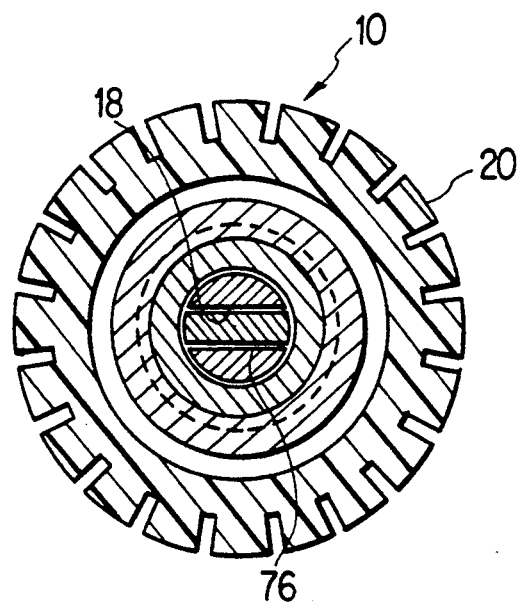
FIG. 5 is a cross-sectional view on lines 5—5 in FIG. 3.

As best seen in FIGS. 4 and 7, the passageway 26 is plugged by a threaded cap 132 downstream of the juncture between the passageway 26 and the fourth bore 50.

As seen in FIG. 6, the valve body 16 is preferably polygonal in cross-section; is more preferably rectangular in cross-section; and is still more preferably square in cross-section. Preferably the first handle 20 is on one side of the polygon, and the second handle 128 is on another side of the polygon. In any event, the second handle 128 is sufficiently spaced from the first handle 20 to permit easy manual manipulation of both handles.

CAVEAT

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A high pressure fluid valve comprising:
   (a) a valve body containing:
      (i) a first bore that extends in a first direction and that has a first end that communicates with the exterior of said valve body and a second end;
      (ii) a second bore that extends in a second direction that is at least approximately perpendicular to said first direction and that has a first end and a second end that communicates with the exterior of said valve body, said second bore communicating with said first bore at a first juncture located interiorly of said valve body; and
      (iii) a passageway that has a first end and a second end that communicates with the exterior of said valve body, said passageway communicating with said second bore at a second juncture located interiorly of said valve body and spaced from said first juncture;
   (b) a valving member that is received in said second bore and that is movable into and out of a position in which it blocks said second bore between said first juncture and said second juncture; and
   (c) a first handle that is manually manipulatable from the exterior of said valve body and that is operably connected to said valving member such that movement of said first handle causes corresponding movement of said valving member;
   (d) a yoke that is sized and shaped to fit over said valve body and that has a throughhole sized, shaped, and positioned to be brought into register with said second end of said passageway in said valve body; and
   (e) a second handle that is manually manipulatable from the exterior of said valve body, that is operably connected to said yoke such that movement of said second handle in one direction causes said throughhole in said yoke to be brought into register with said second end of said passageway in said valve body, and that is sufficiently spaced from said first handle to permit easy manual manipulation of both said first handle and said second handle.

2. A high pressure fluid valve as recited in claim 1 wherein:
   (a) the first end of each of said first and second bores and the first end of said passageway are the upstream ends and
   (b) the second end of each of said first and second bores and the second end of said passageway are the downstream ends.

3. A high pressure fluid valve as recited in claim 1 wherein said valve body has first external threads surrounding said first end of said first bore.

4. A high pressure fluid valve as recited in claim I and further comprising a pressure gauge operably connected to said first bore.

5. A high pressure fluid valve as recited in claim 1 wherein said passageway comprises:
   (a) a third bore that is at an angle to said first bore and that has a first end and a second end, said first end of said third bore communicating with said second bore at said second juncture, and
   (b) a fourth bore that is at least approximately perpendicular to said second bore and to said third bore and that has a first end that communicates with said third bore and a second end that communicates with the exterior of said valve body.

6. A high pressure fluid valve as recited in claim 1 wherein:
   (a) said second bore is a stepped bore comprising a first portion having a first diameter and a second portion having a second, larger diameter;
   (b) said second portion of said second bore contains second internal threads; and
   (c) said valving member has second external threads sized, shaped, and positioned to cooperate with said second external threads in said second portion of said second bore.

7. A high pressure fluid valve as recited in claim 6 wherein:
   (a) a first valve seat is formed around the opening of said first portion of said second bore into said second portion of said second bore and
   (b) said valving member is moved into and out of engagement with said first valve seat by manipulation of said first handle.

8. A high pressure fluid valve as recited in claim 6 wherein:
   (a) said stepped bore also comprises a third portion having a third diameter that is larger than said second diameter;
   (b) said third portion of said second bore contains third internal threads;
   (c) said first handle has third external threads sized, shaped, and positioned to cooperate with said third internal threads in said third portion of said second bore; and
   (d) said first handle is operatively connected to said valving member by a means that permits lost motion between said valving member and said first handle in the axial direction of said second bore.

9. A high pressure fluid valve as recited in claim 8 wherein said means comprise:
   (a) a non-radially symmetrical male protuberance on one of said valving member and said first handle and
   (b) a corresponding female receptacle on the other one of said valving member and said first handle.

10. A high pressure fluid valve as recited in claim 8 wherein:
    (a) a second valve seat is formed around the opening of said second portion of said second bore into said third portion of said second bore and
    (b) said first handle is seated against said second valve seat to prevent fluid leakage between said second portion of said second bore and said third portion of said second bore.

11. A high pressure fluid valve as recited in claim 8 wherein said first handle comprises:
    (a) a cup shaped member comprising a cylindrical lip and a bottom, said third external threads being formed on the exterior of said cylindrical lip and an axial throughhole being formed in said bottom;
    (b) a rod member mounted in said axial throughhole in said bottom of said cup shaped member, said rod member having a first end that is operatively connected to said valving member and a second end; and
    (c) a knob mounted on said second end of said rod member.

12. A high pressure fluid valve as recited in claim 11 and further comprising packing between said cylindrical lip of said cup shaped member and said rod member to prevent fluid leakage between said cup shaped member and said rod member.

13. A high pressure fluid valve as recited in claim 11 wherein:
 (a) said second end of said rod member has fourth external threads and
 (b) said first handle further comprises:
   (i) a head member having an axial bore containing fourth internal threads sized, shaped, and positioned to cooperate with said fourth external threads and
   (ii) a compression spring having a first end bearing against said knob and a second end bearing against said head member.

14. A high pressure fluid valve as recited in claim 1 wherein:
 (a) said valve body is polygonal in cross-section and
 (b) said first handle is on one side of said polygon and said second handle is on another side of said polygon.

15. A high pressure fluid valve as recited in claim 14 wherein said valve body is rectangular in cross-section.

16. A high pressure fluid valve as recited in claim 15 wherein said valve body is square in cross-section.

* * * * *